US009288784B2

(12) United States Patent
Tarr et al.

(10) Patent No.: US 9,288,784 B2
(45) Date of Patent: Mar. 15, 2016

(54) CONTROLLING COMMUNICATION MODE CHANGES IN A COMMUNICATION SYSTEM

(75) Inventors: Morton Tarr, Bolton, MA (US); Alexander Healy, Pyrmont (AU)

(73) Assignee: Bose Corporation, Framingham, MA (US)

( * ) Notice: Subject to any disclaimer, the term of this patent is extended or adjusted under 35 U.S.C. 154(b) by 662 days.

(21) Appl. No.: 13/475,064

(22) Filed: May 18, 2012

(65) Prior Publication Data
US 2013/0307677 A1 Nov. 21, 2013

(51) Int. Cl.
| | |
|---|---|
| G05B 11/01 | (2006.01) |
| G08C 19/16 | (2006.01) |
| H04Q 5/22 | (2006.01) |
| H04B 7/00 | (2006.01) |
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(Continued)

(52) U.S. Cl.
CPC ......... *H04W 68/00* (2013.01); *H04N 21/42207* (2013.01); *H04W 76/025* (2013.01); *G08C 17/02* (2013.01); *H04N 21/4126* (2013.01); *H04W 4/008* (2013.01); *H04W 36/0005* (2013.01); *H04W 36/06* (2013.01); *H04W 36/20* (2013.01); *H04W 76/02* (2013.01); *H04W 76/046* (2013.01); *H04W 84/10* (2013.01); *H04W 84/18* (2013.01)

(58) Field of Classification Search
None
See application file for complete search history.

(56) References Cited

U.S. PATENT DOCUMENTS 4,149,125 A * 4/1979 Ikeguchi et al. .............. 331/1 A
5,491,839 A * 2/1996 Schotz ........................... 455/39
(Continued)

FOREIGN PATENT DOCUMENTS

| WO | 03/065289 A1 | 8/2003 |
| WO | 03/085897 A1 | 10/2003 |
| WO | 2011/042417 A2 | 4/2011 |

OTHER PUBLICATIONS

Matthew S. Gast, "802.11® Wireless Networks: The Definitive Guide" (2d ed. 2005), http://gegeek.com/documents/eBooks/802.11%20Wireless%20Networks%20the%20Definitive%20Guide%20Second%20Edition.pdf, published Apr. 2005, accessed Sep. 13, 2014.*

(Continued)

*Primary Examiner* — Mohamed Barakat
(74) *Attorney, Agent, or Firm* — Brian M. Dingman; Dingman, McInnes & McLane, LLP

(57) ABSTRACT

In response to receiving an indication at a primary device of initiation of a communication mode change, the primary device transmits a first command. Each of one or more secondary devices that are in a responsive state when the first command is transmitted responds to the first command with a response message and remains in a responsive state until a second command is received from the primary device. Each secondary device that is not in a responsive state when the first command is transmitted changes to a responsive state after a predetermined amount of time in a non-responsive state and remains in a responsive state for at least a minimum time duration. The primary device collects response messages received from secondary devices, and in response to the number of response messages received being equal to an indicated number, transmits the second command.

30 Claims, 6 Drawing Sheets

(51) Int. Cl.
*H04W 68/00* (2009.01)
*H04N 21/422* (2011.01)
*H04W 76/02* (2009.01)
H04N 21/41 (2011.01)
G08C 17/02 (2006.01)
H04W 84/18 (2009.01)
H04W 36/00 (2009.01)
H04W 36/06 (2009.01)
H04W 76/04 (2009.01)
H04W 84/10 (2009.01)
H04W 36/20 (2009.01)

(56) References Cited

U.S. PATENT DOCUMENTS

| | | | | |
|---|---|---|---|---|
| 5,625,881 | A * | 4/1997 | Sandler et al. | 340/7.32 |
| 5,765,100 | A * | 6/1998 | Martino | 455/59 |
| 5,768,345 | A * | 6/1998 | Takebe et al. | 455/464 |
| 5,802,582 | A * | 9/1998 | Ekanadham et al. | 711/152 |
| 6,466,832 | B1 * | 10/2002 | Zuqert et al. | 700/94 |
| 6,697,415 | B1 | 2/2004 | Mahany | |
| 7,095,866 | B1 | 8/2006 | Drakoulis et al. | |
| 7,486,798 | B2 | 2/2009 | Anjanappa et al. | |
| 7,865,196 | B2 | 1/2011 | Stahl et al. | |
| 8,594,150 | B1 * | 11/2013 | Husted | 375/132 |
| 2009/0310803 | A1 | 12/2009 | Zhang et al. | |
| 2010/0322287 | A1 | 12/2010 | Truong et al. | |
| 2011/0038488 | A1 | 2/2011 | Humphreys | |
| 2011/0080935 | A1 | 4/2011 | Kim et al. | |
| 2012/0007724 | A1 * | 1/2012 | Murakami et al. | 340/12.5 |

OTHER PUBLICATIONS

International Search Report and Written Opinion dated Dec. 12, 2013 for PCT/US2013/041538.

* cited by examiner

COMMAND TRANSMISSION TIMES

CONTROLLING COMMUNICATION MODE CHANGES IN A COMMUNICATION SYSTEM

BACKGROUND

Some wireless systems have multiple devices that communicate over a shared medium. For example, a wireless audio system may include a primary device on one side of a room that has a control console and one or more speakers. Additional surround speaker units may be located at different locations in the room, and may include a wireless communication interface to communicate with the primary device. The communication can include streaming a music signal over a wireless channel from the primary device, and receiving the music signal at each of the distributed speaker units.

SUMMARY

In one aspect, in general, a method for operating devices in any of a plurality of different modes of communication using different respective communication channels. The method includes: receiving an indication at a primary device of initiation of a communication mode change from a communication mode using a first communication channel to a communication mode using a second communication channel, and in response to the indication, transmitting a first command from the primary device over the first communication channel, where the primary device stores information indicating a number of secondary devices from which a response is expected. The method also includes, at each of the secondary devices that are in a responsive state when the first command is transmitted, responding to the first command with a response message transmitted over the first communication channel and remaining in a responsive state until a second command is received from the primary device over the first communication channel, where each secondary device that is not in a responsive state when the first command is transmitted changes to a responsive state after a predetermined amount of time in a non-responsive state and remains in a responsive state for at least a minimum time duration. The method also includes, at the primary device, collecting response messages received from secondary devices over the first communication channel, and in response to the number of response messages received being equal to the indicated number, transmitting the second command from the primary device over the first communication channel.

Aspects can include one or more of the following features.

The method further comprises, at the primary device, if the number of response messages received is less than the indicated number, repeatedly transmitting the first command from the primary device over the first communication channel one or more additional times.

Repeatedly transmitting the first command from the primary device over the first communication channel one or more additional times includes periodically transmitting the first command with a repetition period smaller than the minimum time duration.

The method further comprises, at each of the secondary devices that received a retransmission of the first command after changing to a responsive state, responding to the first command with a response message transmitted over the first communication channel and remaining in a responsive state until the second command is received from the primary device over the first communication channel.

The method further comprises, at each of the secondary devices in a responsive state after receiving the first command, changing from the communication mode using the first communication channel to communication mode using the second communication channel, in response to receiving the second command from the primary device over the first communication channel.

The method further comprises, at the primary device, changing from the communication mode using the first communication channel to communication mode using the second communication channel, after transmitting the second command over the first communication channel.

The primary device changes communication modes in response to receiving acknowledgments of the second command over the first communication channel from the indicated number of the secondary devices.

The method further comprises, at the primary device, receiving confirmations of communication mode changes over the second communication channel from the indicated number of the secondary devices.

The method further comprises, at each of the secondary devices that changed from the communication mode using the first communication channel to communication mode using the second communication channel, returning to a previous state that the secondary device was in when the first command was received.

The previous state comprises a state selected from the group consisting of: a responsive operational state in which a device is operational and responsive to received commands, a responsive sleep state in which a device is non-operational but responsive to commands, and a non-responsive sleep state in which a device is non-operational and non-responsive to commands.

The first communication channel comprises a frequency within a first frequency range, and the second communication channel comprises a frequency within a second frequency range different from the first frequency range.

At least one of the first frequency range or the second frequency range includes multiple non-contiguous frequency bands.

The indication comprises an input received at the primary device.

The input comprises a change of state of a switch on the primary device.

The input comprises a signal received by the primary device from a remote control.

The indication comprises a detection at the primary device of interference over the first communication channel.

The information indicating the number of secondary devices from which a response is expected comprises a list of the secondary devices from which a response is expected.

The method further comprises transmitting a first multimedia signal from the primary device to one or more of the secondary devices over the second channel after changing from the communication mode using the first communication channel to communication mode using the second communication channel, and concurrently transmitting a second multimedia signal from a coexisting device, different from the primary device and the secondary devices, over the first communication channel.

In another aspect, in general, a system comprises: a primary device, including a transceiver configured to communicate in any of the plurality of different modes of communication using different respective communication channels, the primary device configured to receive an indication of initiation of a communication mode change from a communication mode using a first communication channel to a communication mode using a second communication channel, and in response to the indication, transmit a first command over the first communication channel, the primary device storing information indicating a number of secondary devices from which a response is expected. The system further comprises: one or more secondary devices, each including a transceiver configured to communicate in any of a plurality of different modes of communication using different respective communication channels. Each secondary device is configured to: if the secondary device is in a responsive state when the first command is transmitted, respond to the first command with a response message transmitted over the first communication channel and remaining in a responsive state until a second command is received from the primary device over the first communication channel, or if the secondary device is not in a responsive state when the first command is transmitted, change to a responsive state after a predetermined amount of time in a non-responsive state and remain in a responsive state for at least a minimum time duration. The primary device is further configured to: collect response messages received from secondary devices over the first communication channel, and in response to the number of response messages received being equal to the indicated number, transmit the second command from the primary device over the first communication channel.

Aspects can include one or more of the following features.

If the number of response messages received is less than the indicated number, the primary device is configured to repeatedly transmit the first command over the first communication channel one or more additional times.

Repeatedly transmitting the first command from the primary device over the first communication channel one or more additional times includes periodically transmitting the first command with a repetition period smaller than the minimum time duration.

Each of the secondary devices that received a retransmission of the first command after changing to a responsive state is configured to respond to the first command with a response message transmitted over the first communication channel and remain in a responsive state until the second command is received from the primary device over the first communication channel.

Each of the secondary devices in a responsive state after receiving the first command is configured to change from the communication mode using the first communication channel to communication mode using the second communication channel, in response to receiving the second command from the primary device over the first communication channel.

The primary device is configured to change from the communication mode using the first communication channel to communication mode using the second communication channel, after transmitting the second command over the first communication channel.

The primary device is configured to change communication modes in response to receiving acknowledgments of the second command over the first communication channel from the indicated number of the secondary devices.

Each of the secondary devices that changed from the communication mode using the first communication channel to communication mode using the second communication channel is configured to return to a previous state that the secondary device was in when the first command was received.

The previous state comprises a state selected from the group consisting of: a responsive operational state in which a device is operational and responsive to received commands, a responsive sleep state in which a device is non-operational but responsive to commands, and a non-responsive sleep state in which a device is non-operational and non-responsive to commands.

The first communication channel comprises a frequency within a first frequency range, and the second communication channel comprises a frequency within a second frequency range different from the first frequency range.

At least one of the first frequency range or the second frequency range includes multiple non-contiguous frequency bands.

The indication comprises an input received at the primary device.

The input comprises a change of state of a switch on the primary device.

The input comprises a signal received by the primary device from a remote control.

The indication comprises a detection at the primary device of interference over the first communication channel.

The information indicating the number of secondary devices from which a response is expected comprises a list of the secondary devices from which a response is expected.

Aspects can have one or more of the following advantages.

The techniques for operating wireless devices enable continued wireless communication between a transceiver in a primary device, such as a front-of-room control unit, and transceivers in one or more secondary devices, such as two rear-of-room speaker units. For example, continued communication can be ensured after an event such as a change of communication mode initiated at the primary device, even if the secondary devices are not in a responsive state at the time the change is initiated. In some examples, multiple modes of communication are provided to reduce that likelihood of interference from the ever-increasing amount of wireless traffic from devices operating in domestic environments. In some environments, these wireless devices are able to interoperate without affecting, or being affected by, other devices. However, in some environments, a wireless audio system in a home, for example, may encounter interference from another device or system in the home that is emitting radiation in at least a portion of the same wireless spectrum that is being used by the audio system. For example, the Industrial, Scientific and Medical (ISM) radio frequency (RF) bands includes unlicensed RF bands that are typically used by various devices including devices using RF communication such as cordless phones and local area computer networks, or other devices that emit radiation in these bands such as microwave ovens.

By providing multiple communication modes that each use different respective communication channels in different bands, a user is more likely to be able to find a mode in which the interference is eliminated or reduced. With the large number of possible combinations of potentially interfering devices that may exist in any particular home, it is possible that the mode with the least interference in one home may be different from the mode with the least interference in another home. A user input, such as a switch on a control unit or a button on a remote control, gives a user the ability to select a desired mode, and the system is able to manage the transition to the desired mode for different devices in the system, without the user needing to ensure all devices in the system are in a particular state (e.g., a responsive state). For example the user can initiate a mode change if interference or drop-outs are perceived.

Other features and advantages of the invention are apparent from the following description, and from the claims.

DESCRIPTION

Figure 1A:
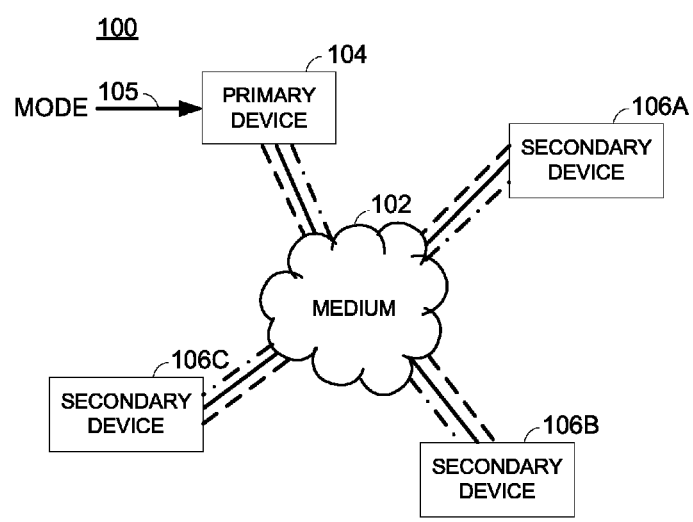
FIG. 1A is a block diagram of a distributed system.

Referring to FIG. 1A, a distributed system 100 includes multiple devices that are each configured to communicate over a shared communication medium 102. For example, in a wireless system, each device includes an antenna for transmitting and receiving RF electromagnetic waves, with the devices forming an ad hoc wireless network (e.g., a decentralized network that enables peer-to-peer communication without requiring a central access point). A primary device 104 includes a mode selector 105 that is used to indicate which of multiple communication modes the system should use. The system 100 also includes one or more secondary devices 106A-106C. In some implementations, the primary device 104 communicates with each secondary device, but the secondary devices do not necessarily communicate with each other. For example, in a music system, the primary device 104 may broadcast one or more music streams (e.g., multiple corresponding stereo or surround-sound streams), with each secondary speaker device receiving the appropriate stream for that device. The secondary speaker devices may need to transmit messages to the primary device (e.g., to acknowledge commands or report status), but may not need to communicate with other secondary speaker devices.

The mode selector 105 at the primary device 104 can be configured to indicate a change in communication mode in any of a variety of ways. In some implementations, the mode selector 105 is a switch, which can be set by a user to any of multiple states corresponding to respective communication modes. A hardware switch can include a sliding control with multiple positions, or a set of radio buttons, for example. A software switch can have information indicating the selected state stored in a memory, with a particular state being selected by an input on a remote control, for example. The user may be able to most easily perceive when there is interference, or which mode has the least interference. In other implementations, the mode selector 105 is a module in the primary device 104 that is configured to automatically detect when there is interference, and respond by indicating a change to a new communication mode.

Each communication mode can correspond to a different frequency band or set of frequency bands, within which the system 100 will operate. In one example, there are three different communication modes, operating at frequency bands centered at 2.4 GHz, 5.3 GHz, and 5.8 GHz, respectively. The system 100 is initially configured to operate in one of the bands by default (e.g., in a factory default setting), such as the 5.8 GHz band. The default band may correspond to a band least likely to experience interference in a typical domestic environment.

Each band can have one or more specific frequencies (or "channels") that may be selected for use in modulating signals. For some modulation schemes, multiple channels are used in a frequency division multiplexing scheme. For some modulation schemes, a single channel is used. If multiple channels are available in a band that corresponds to the currently selected communication mode, the channel to be used may be selected according to a predetermined protocol programmed into each of the devices. In some examples, a communication mode may use a set of multiple non-contiguous frequency bands, with one or more channels available in each of the separate bands.

Figure 1B:
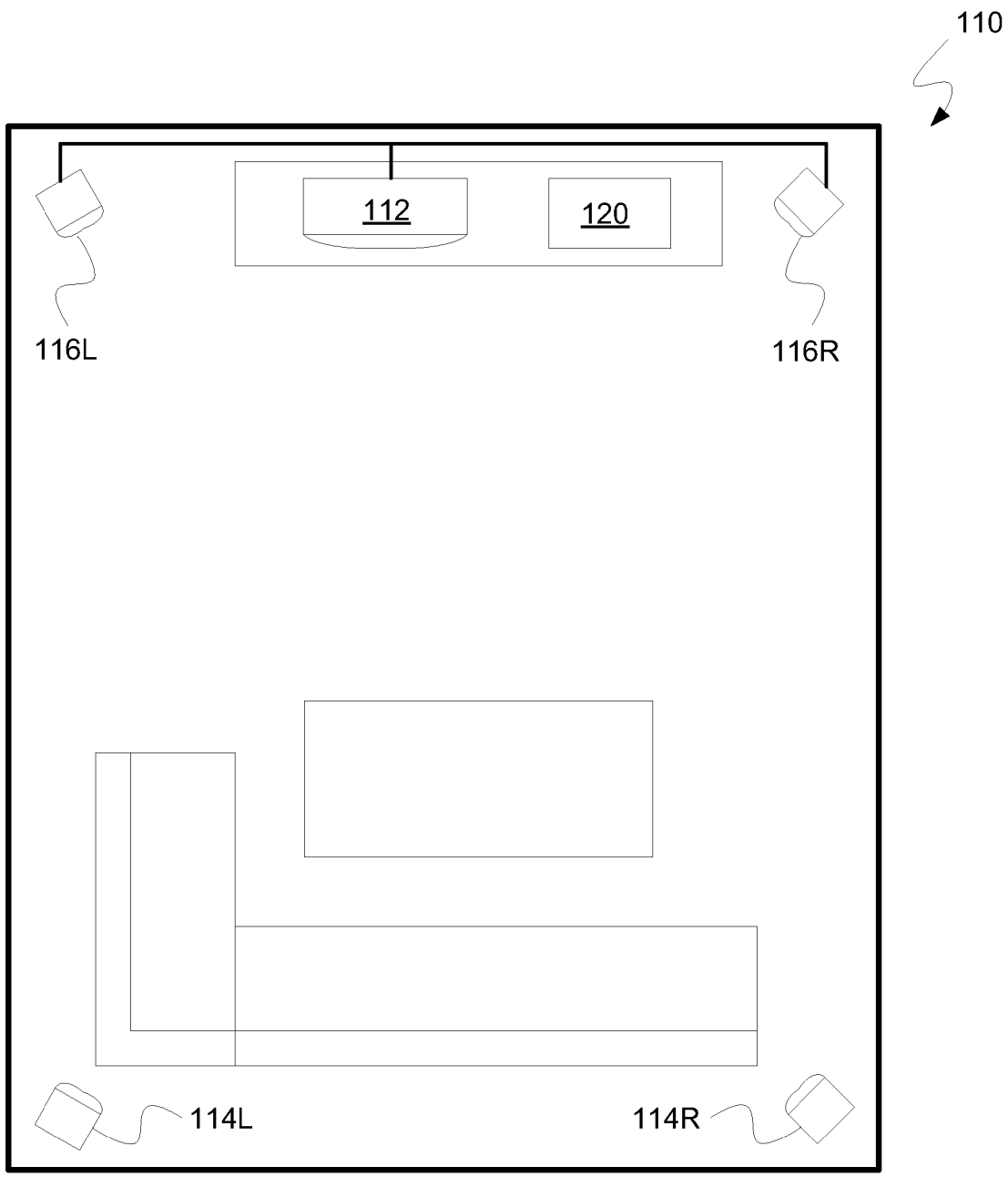
FIG. 1B is a plan view of a living room environment for a music system.

FIG. 1B shows an example of a distributed music system, in the exemplary environment of a living room 110, that uses a communication mode controlled by a mode control procedure, as described in more detail below. The system includes a control console 112 (as a primary device), and a left-side surround speaker 114L and a right-side surround speaker 114R (as secondary devices). In this example, the control console 112 is in wireless communication with each of the surround speakers 114L and 114R, and has a wired connection to front-of-room speakers 116L and 116R. A set-top box 120 is an external wireless device that is not part of the distributed music system, but is configured to communicate over a wireless channel (e.g., to receive a video stream from a wireless access point in a different room). A user is able to notice when there is interference (e.g., dropouts or noise) in music being played by the system, and decide that the communication mode used by the distributed music system should be changed. The interference may be perceptible, for example, as dropouts in the music occurring intermittently when one or more of the devices receives an RF signal from the external wireless access point or other external source. For example, an RF signal from the wireless access point may be relatively weak, but sufficiently strong to support a wireless link to the set-top box 120. The RF signal from the wireless access point may be weak enough for the music system to be able to operate without detecting that the RF signal is a potential source of interference. By adjusting a switch on the control console 112, the user is able to change the communication mode to avoid the potential interference. Another reason the user may desire to change the communication mode is to avoid a potentially interfering wireless signal from a neighboring house.

Figure 2A:
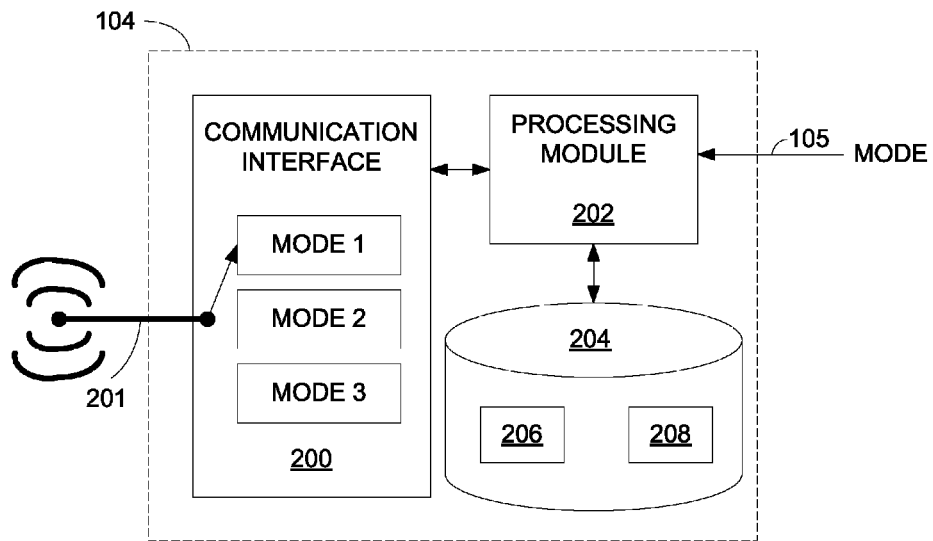
FIGS. 2A and 2B are block diagrams of devices in the distributed system.

Referring to FIG. 2A, an example of the primary device 104 includes a communication interface 200 that includes transceiver circuitry that selects among multiple communication modes in which the device 104 is operating. The selected mode determines one or more frequency channels used for modulating and demodulating signals on RF waveforms transmitted from and received by an antenna 201. In this example, there are three communication modes. The communication interface 200 is coupled to a processing module 202 that is programmed to perform the mode control procedure described herein. For example, some implementations of the processing module 202 include one or more processors that execute programs for controlling various features of the device 104, coupled to a memory system 204 (e.g., including volatile memory, non-volatile memory, or both). The mode selector 105 (e.g., a switch) is coupled to the processing module 202. Information that may be stored in the memory system 204 includes device information 206 that indicates the number of secondary devices that are currently part of the system 100. For example, the device information 206 can be a count of the number of secondary devices, or a list of secondary device identifiers. The primary device 104 is able to use this device information 206 to determine how many responses are expected during the mode control procedure. The memory system may also store other information related to controlling communication modes, such as response information 208 indicating how many responses have been received at any given time.

Figure 2B:
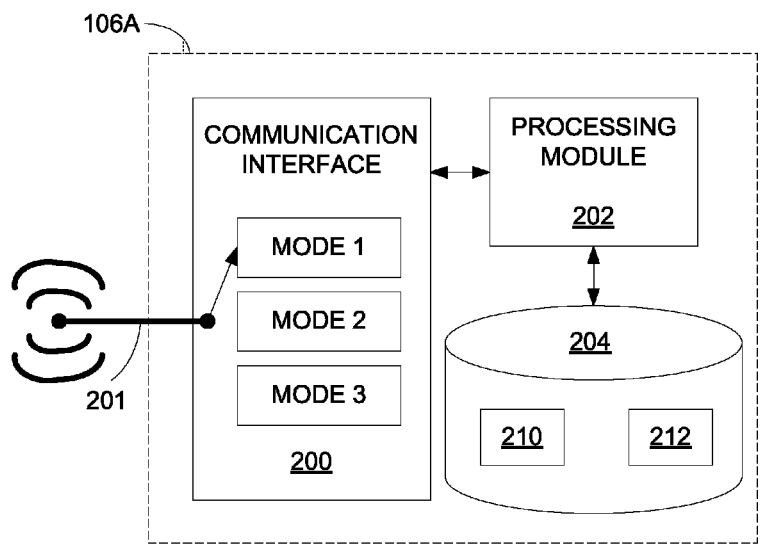

Referring to FIG. 2B, an example of the secondary device 106A includes a communication interface 200, a processing module 202 and a memory system 204 similar to those in the primary device 104. For the secondary device 106A, the information stored in the memory system 204 includes information such as buffered data 210 so that a device such as a speaker is able to continue playing music without interruption during a mode change, as described in more detail below. The information also includes other information associated with the mode control procedure, and state information 212 indicating a previous state to which the device 206A will return after changing communication modes.

Figure 3:
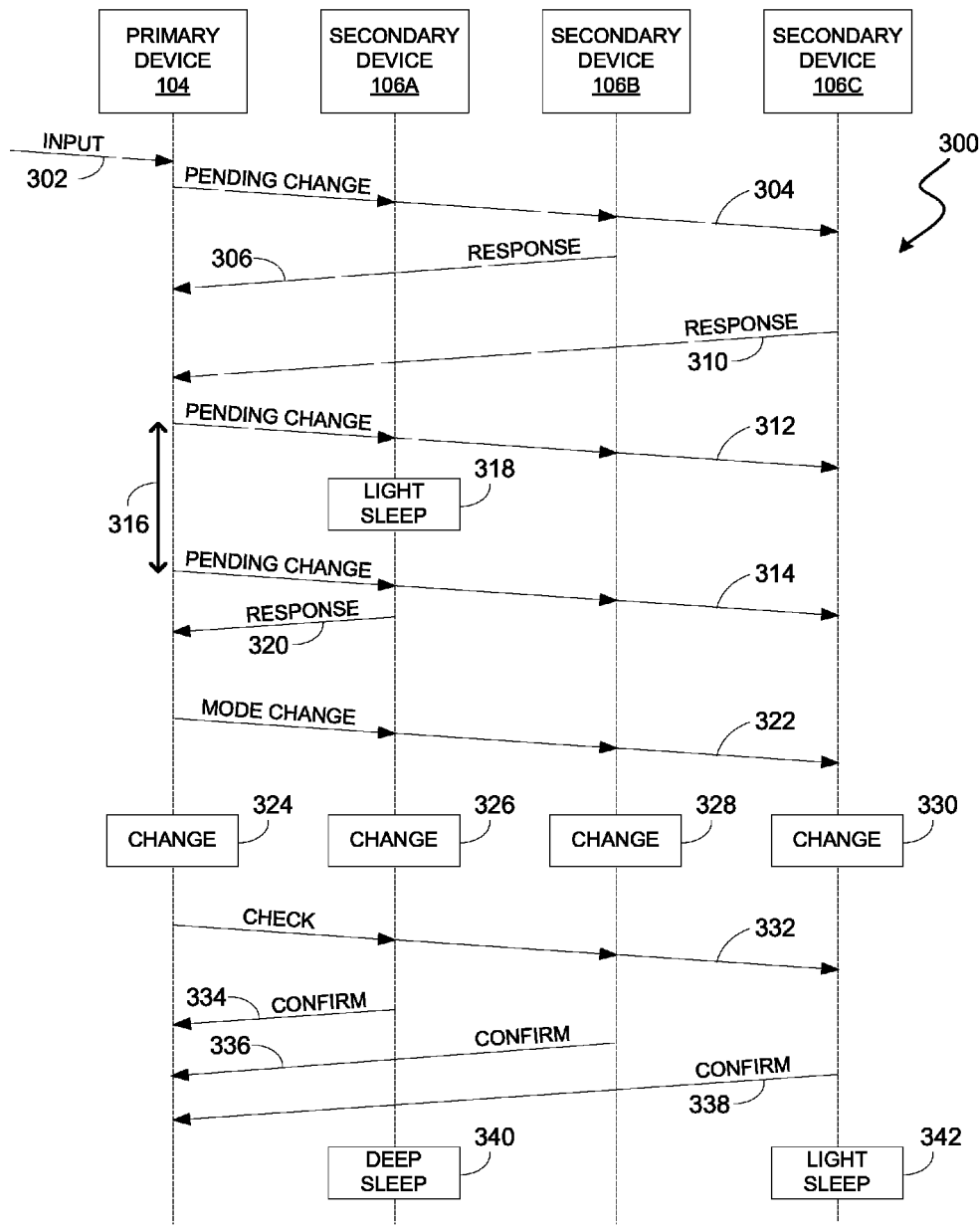
FIG. 3 is a diagram of a communication pattern for a mode control procedure.

FIG. 3 shows an example of a communication pattern 300 among the primary device 104 and secondary devices 106A-106C for a mode control procedure. A user input 302 is received at the primary device 104 to indicate a change in communication modes is desired. In response, the primary device 104 broadcasts a pending mode change command 304. Whether or not a secondary device is able to receive the pending mode change command 304 depends on what state that device is in when the command 304 arrives at its antenna.

Generally, the secondary devices 106A-106C may be in different states when a pending mode change command is broadcast. In this example, the device 106B is in an "awake" state, which is a responsive operational state in which the device 106B is operational and responsive to received commands. The device 106C is in "light sleep" state, which is a responsive sleep state in which the device 106C is non-operational but responsive to commands. The device 106A is in a "deep sleep" state, which is a non-responsive sleep state in which the device 106A is non-operational and non-responsive to commands.

Since the devices 106B and 106C are in a responsive state, when the pending mode change command 304 is broadcast, they are able to receive and process the command. The device 106B transmits a response message 306, which is received by the primary device 104. Even though the response message 306 is broadcast as a wireless transmission that may be received by any antenna within a certain transmission range, it is encoded as a message intended for the primary device 104 (e.g., using an appropriate destination address) so other devices in the transmission range, including devices in or out of the distributed system 100, are able to safely ignore the message. Reception of the pending mode change command 304 prompts the device 106C to transition from the light sleep state to an awake state. The device 106C transmits a response message 310, which is received by the primary device 104. Any devices that were awake when receiving a pending mode change command, or that transitioned from a light sleep state into an awake state in response to receiving a pending mode change command, stay in the awake state for the duration of the mode control procedure.

The primary device 104 collects the response messages and maintains a count of the number of secondary devices that have responded. If the count is less than the number of secondary devices that are currently part of the system 100 (e.g., as indicated by the device information 206), then the primary device continues to repeatedly transmit a pending mode change command until the correct number of responses have been received (or until a predetermined time-out limit). The primary device 104 can be configured to wait for a predetermined delay after transmitting the pending mode change command 304 before checking the count to allow devices that are in an awake or light sleep state to respond. For example, a device that is awake may be expected to respond within a short time period (e.g., around 2 ms), and a device that is in light sleep may be expected to respond within a relatively longer time period (e.g., around 50 ms).

The devices that have not yet responded when the count is checked may include devices, such as device 106A, that were in a deep sleep state when the pending mode change command 304 was broadcast. A device in the system 100 that goes into a deep sleep state (e.g., to preserve battery life after a period of inactivity) is configured to transition out of deep sleep to a light sleep state (or other responsive state) periodically, and remain in the light sleep state for a minimum time duration $T_R$ (e.g., 0.5 seconds). There may also be a maximum time duration $T_S$ that the device is permitted to remain in the deep sleep state (e.g., 5 seconds) during this periodic transition between deep and light sleep.

In this example, the primary device 104 begins repeatedly transmitting pending mode change commands 312 and 314 with a repetition period 316. The repetition period 316 is selected to be smaller than the minimum time duration $T_R$ so that any devices periodically transitioning between deep and light sleep will revive at least one pending mode change command while in the light sleep state. The device 106A is still in a deep sleep state when the pending mode change command 312 is transmitted, but transitions 318 to light sleep state before the mode change command 314 is transmitted. Reception of the mode change command 314 prompts the device 106A to transition from the light sleep state to an awake state. The device 106A transmits a response message 320, and remains in the awake state for the duration of the mode control procedure.

Figure 4A:
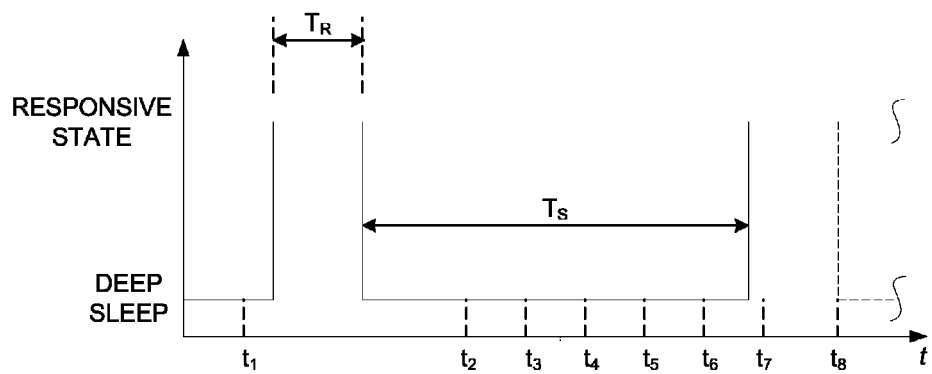
FIGS. 4A and 4B are timing diagrams for a portion of a mode control procedure.
Figure 4B:
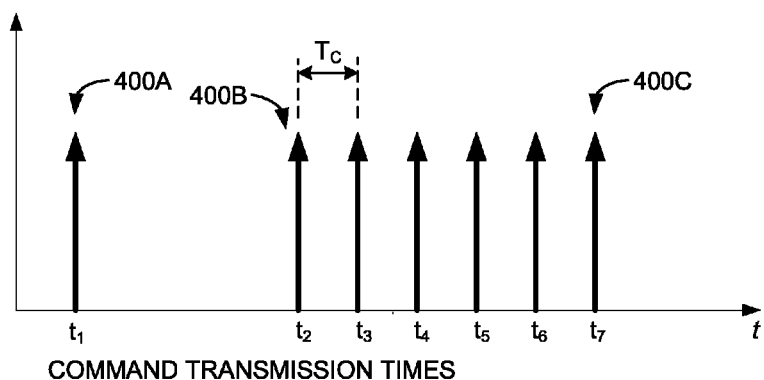

FIGS. 4A and 4B, illustrate an example of timing for repeated transmission of a pending mode change command when a secondary device does not respond to an initial pending mode change command that arrives when the secondary device is in the deep sleep state. A primary device transmits an initial pending mode change command 400A at a time $t_1$. At time $t_1$ the secondary device is in the deep sleep state. FIG. 4A shows a portion of the periodic transition between deep and light sleep, with the secondary device transitioning to a responsive state (e.g., light sleep) after time $t_1$ and remaining in that responsive state for a time $T_R$ and then transitioning back to deep sleep before the primary device repeats transmission of a pending mode change command 400B for the first time at time $t_2$, after determining that not all secondary devices have responded. The primary device continues to repeat pending mode change commands at times $t_1, t_2, \ldots, t_7$, with a repetition period of $T_C$. After a time $T_S$ in the deep sleep state, the secondary device has transitioned again to a responsive state and is responsive at time $t_7$ when the pending mode change command 400C is transmitted. Because $T_C$ is smaller than $T_R$, the secondary device won't accidentally miss one of the repeated pending channel change commands. The secondary device then remains in a responsive state (e.g., awake) instead of returning to deep sleep at time $t_8$.

The primary device 104 continues to repeatedly compare the number of response messages received with the number expected. After the expected number of response messages have been received, the primary device 104 broadcasts a mode change command 322 (still using the original communication mode) to the secondary devices, which are all in the awake state. The mode change command 322 includes information designating the new communication mode that the devices will use. Alternatively, information designating the new communication mode can be included in the pending mode change commands. The primary device 104 and the secondary devices 106A-106C are configured to change from the original communication mode to the new communication mode within some window of time after reception of the mode change command 322. In some implementations, the mode changes 324, 326, 328, 330 may be coordinated to occur at approximately the same time, such as a particular amount of time after reception of the mode change command 322.

After the primary device 104 has changed communicate modes, the primary device 104 broadcasts a check message 332, using the new communication mode, to confirm that all the secondary devices have successfully changed to the new communication mode. The secondary devices transmit confirmation messages 334, 336, 338 to acknowledge successful receipt of the check message 332 and confirm the communication mode change. If any secondary device does not send a confirmation message within a predetermined amount of time, the primary device may optionally initiate a reset sequence or a backtracking sequence that restores communication over the original communication mode or another default communication mode. The secondary devices can also perform recovery procedures to recover from a failed communication mode change. For example, a device that has been stranded using a different communication mode from other devices after a failure is able to determine a correct communication mode (e.g., the communication mode being used by the primary device) by searching for a periodic "heartbeat" signal. The heartbeat signal, for example, can be a low repetition rate beacon signal that is continuously broadcast by the primary device such that when the beacon is not received after a predetermined amount of time, a device goes into a search mode attempting to detect the beacon on channels of each of the possible communication modes. Additionally, the system can be configured to prompt for user action as part of various recovery procedures.

Other examples of the mode control procedure can include communication of commands or data, and/or additional rounds of response messages collected at the primary device 104 to confirm reception of commands or data. For example, in some implementations of the mode control procedure, before transmitting the mode change command 322, the primary device broadcasts a check message, and the secondary devices confirm reception of the check message. After the primary device receives the expected number of confirmation messages, the change channel command 322 is transmitted, as in the communication pattern 300. Another example of additional communication that may occur during a mode control procedure for a music system is transmission of supplementary music data to ensure that any devices that are playing music before the mode control procedure begins do not experience an interruption in the music due to a pause in transmission of a music stream from the primary device during the communication mode change. For example, before the mode change 324, the primary device may transmit a large enough advance section of the music stream so that the secondary devices will be able to play from a buffer while the devices are changing communication modes.

Optionally, devices can also be configured to return to a previous state that the device was in when the mode control procedure began (e.g., when the pending mode change command was received). In the communication pattern 300, the secondary device 106A returns 340 to a deep sleep state, and the secondary device 106C returns 342 to a light sleep state.

Figure 5:
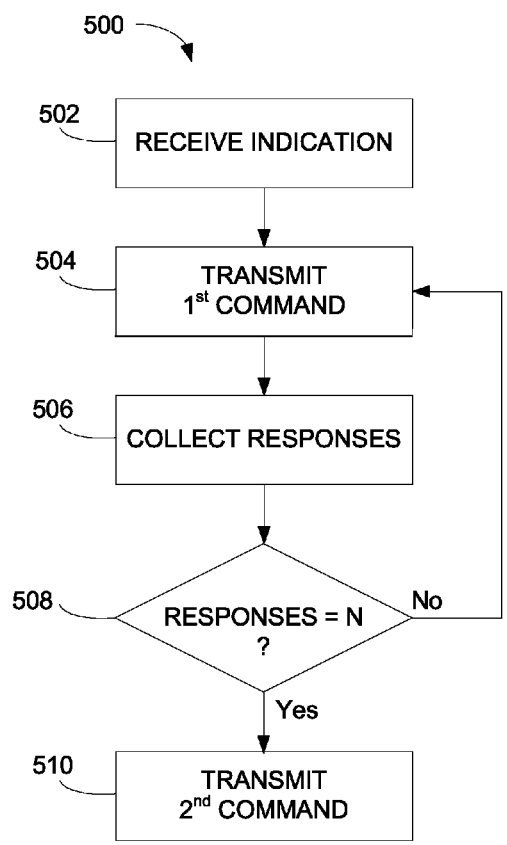
FIG. 5 is a flowchart for a mode control procedure.

Referring to FIG. 5, an example of a mode control procedure 500, performed at a primary device, starts in response to receiving (502) an indication of initiation of a communication mode change. In response to the indication, the primary device transmits (504) a first command (e.g., pending mode change command) from the primary device. The primary device collects (506) response messages from secondary devices. The primary device repeatedly compares (508) the number of response messages that have been received to the number of secondary devices N indicated by the device information. If the number of response messages received is equal to the indicated number N, the primary device transmits (510) a second command (e.g., mode change command). If the number of response messages received is less than the indicated number N, the primary device repeatedly transmits (504) the first command one or more additional times, and continues to collect (506) responses and compare (508) the number of response messages received to N. When the number of responses received is equal to N, the primary device transmits (510) the second command.

The techniques described above can be implemented using a program comprising instructions for execution on a device or module including one or more processors or other circuitry for executing the instructions. For example, the instructions execute procedures of software or firmware that runs on one or more programmed or programmable computing devices or modules including at least one processor and at least one data storage system (e.g., including volatile and non-volatile memory, and/or storage media). The programs may be provided on a computer-readable storage medium, such as a CD-ROM, readable by a general or special purpose programmable computer or delivered over a communication medium such as network to a computer where it is executed. Each such program may be stored on or downloaded to a storage medium (e.g., solid state memory or media, or magnetic or optical media) readable by a computing device, for configuring and operating the device when the storage medium is read by the device to perform the procedures of the program.

It is to be understood that the foregoing description is intended to illustrate and not to limit the scope of the invention, which is defined by the scope of the appended claims. Other embodiments are within the scope of the following claims.

For example, the shared communication medium 102 may include a combination of different types of communication media, including a shared wired medium (e.g., a powerline medium). The distributed system 100 can include other types of devices such as components of a home entertainment system, including video equipment, or computing devices, or home appliances, for example.

What is claimed is:

1. A method for operating devices in any of a plurality of different modes of communication using different respective communication channels, comprising:

receiving an indication at a primary device of initiation of a communication mode change from a communication mode using a first communication channel to a communication mode using a second communication channel, and in response to the indication, transmitting a first command from the primary device over the first communication channel, where the primary device stores information indicating a number of a plurality of secondary devices from which a response is expected;

at each of the plurality of secondary devices that are in a responsive state when the first command is transmitted, responding to the first command with a response message transmitted over the first communication channel and remaining in the responsive state until a second command is received from the primary device over the first communication channel, where each secondary device that is in a non-responsive state when the first command is transmitted changes to the responsive state after a predetermined amount of time in the non-responsive state and remains in the responsive state for at least a minimum time duration; and at the primary device, collecting response messages received from secondary devices over the first communication channel, in response to the number of response messages received being equal to the indicated number, transmitting the second command from the primary device over the first communication channel, and if the number of response messages received is less than the indicated number, repeatedly transmitting the first command from the primary device over the first communication channel one or more additional times, wherein repeatedly transmitting the first command from the primary device over the first communication channel one or more additional times includes periodically transmitting the first command with a repetition period smaller than the minimum time duration.

2. The method of claim 1, further comprising, at each of the secondary devices that received a retransmission of the first command after changing to the responsive state, responding to the first command with a response message transmitted over the first communication channel and remaining in the responsive state until the second command is received from the primary device over the first communication channel.

3. The method of claim 1, further comprising, at each of the secondary devices in the responsive state after receiving the first command, changing from the communication mode using the first communication channel to communication mode using the second communication channel, in response to receiving the second command from the primary device over the first communication channel.

4. The method of claim 3, further comprising, at the primary device, changing from the communication mode using the first communication channel to communication mode using the second communication channel, after transmitting the second command over the first communication channel.

5. The method of claim 4, wherein the primary device changes communication modes in response to receiving acknowledgments of the second command over the first communication channel from the indicated number of the secondary devices.

6. The method of claim 4, further comprising, at the primary device, receiving confirmations of communication mode changes over the second communication channel from the indicated number of the secondary devices.

7. The method of claim 3, further comprising, at each of the secondary devices that changed from the communication mode using the first communication channel to communication mode using the second communication channel, returning to a previous state that the secondary device was in when the first command was received.

8. The method of claim 7, wherein the previous state comprises a state selected from the group consisting of: a responsive operational state in which a device is operational and responsive to received commands, a responsive sleep state in which a device is non-operational but responsive to commands, and a non-responsive sleep state in which a device is non-operational and non-responsive to commands.

9. The method of claim 1, wherein the first communication channel comprises a frequency within a first frequency range, and the second communication channel comprises a frequency within a second frequency range different from the first frequency range.

10. The method of claim 9, wherein at least one of the first frequency range or the second frequency range includes multiple non-contiguous frequency bands.

11. The method of claim 1, wherein the indication comprises an input received at the primary device.

12. The method of claim 11, wherein the input comprises a change of state of a switch on the primary device.

13. The method of claim 11, wherein the input comprises a signal received by the primary device from a remote control.

14. The method of claim 1, wherein the indication comprises a detection at the primary device of interference over the first communication channel.

15. The method of claim 1, wherein the information indicating the number of secondary devices from which a response is expected comprises a list of the plurality of secondary devices from which a response is expected.

16. The method of claim 1, further comprising transmitting a first multimedia signal from the primary device to one or more of the secondary devices over the second channel after changing from the communication mode using the first communication channel to communication mode using the second communication channel, and concurrently transmitting a second multimedia signal from a coexisting device, different from the primary device and the secondary devices, over the first communication channel.

17. A system, comprising:

a primary device, including a transceiver, a processor and memory, where the transceiver is configured to communicate in any of a plurality of different modes of communication using different respective communication channels, the primary device configured to receive an indication of initiation of a communication mode change from a communication mode using a first communication channel to a communication mode using a second communication channel, and in response to the indication, transmit a first command over the first communication channel, the primary device storing in memory information indicating a number of a plurality of secondary devices from which a response is expected; and a plurality of secondary devices, each secondary device including a transceiver, a processor and memory, where the transceiver is configured to communicate in any of the plurality of different modes of communication using different respective communication channels, and each secondary device configured to:

if the secondary device is in a responsive state when the first command is transmitted, respond to the first command with a response message transmitted over the first communication channel and remaining in the responsive state until a second command is received from the primary device over the first communication channel, or if the secondary device is in a non-responsive state when the first command is transmitted, change to the responsive state after a predetermined amount of time in the non-responsive state and remain in the responsive state for at least a minimum time duration;

the primary device further configured to:

collect response messages received from the plurality of secondary devices over the first communication channel, and in response to the number of response messages received being equal to the indicated number, transmit the second command from the primary device over the first communication channel, wherein, if the number of response messages received is less than the indicated number, the primary device is configured to repeatedly transmit the first command over the first communication channel one or more additional times,
wherein repeatedly transmitting the first command from the primary device over the first communication channel one or more additional times includes periodically transmitting the first command with a repetition period smaller than the minimum time duration.

18. The system of claim 17, wherein each of the secondary devices that received a retransmission of the first command after changing to the responsive state is configured to respond to the first command with a response message transmitted over the first communication channel and remain in the responsive state until the second command is received from the primary device over the first communication channel.

19. The system of claim 17, wherein each of the secondary devices in the responsive state after receiving the first command is configured to change from the communication mode using the first communication channel to communication mode using the second communication channel, in response to receiving the second command from the primary device over the first communication channel.

20. The system of claim 19, wherein the primary device is configured to change from the communication mode using the first communication channel to communication mode using the second communication channel, after transmitting the second command over the first communication channel.

21. The system of claim 20, wherein the primary device is configured to change communication modes in response to receiving acknowledgments of the second command over the first communication channel from the indicated number of the secondary devices.

22. The system of claim 19, wherein each of the secondary devices that changed from the communication mode using the first communication channel to communication mode using the second communication channel is configured to return to a previous state that the secondary device was in when the first command was received.

23. The system of claim 22, wherein the previous state comprises a state selected from the group consisting of: a responsive operational state in which a device is operational and responsive to received commands, a responsive sleep state in which a device is non-operational but responsive to commands, and a non-responsive sleep state in which a device is non-operational and non-responsive to commands.

24. The system of claim 17, wherein the first communication channel comprises a frequency within a first frequency range, and the second communication channel comprises a frequency within a second frequency range different from the first frequency range.

25. The system of claim 24, wherein at least one of the first frequency range or the second frequency range includes multiple non-contiguous frequency bands.

26. The system of claim 17, wherein the indication comprises an input received at the primary device.

27. The system of claim 26, wherein the input comprises a change of state of a switch on the primary device.

28. The system of claim 26, wherein the input comprises a signal received by the primary device from a remote control.

29. The system of claim 17, wherein the indication comprises a detection at the primary device of interference over the first communication channel.

30. The system of claim 17, wherein the information indicating the number of secondary devices from which a response is expected comprises a list of the plurality of secondary devices from which a response is expected.

* * * * *